US008626599B2

(12) United States Patent
Eastley et al.

(10) Patent No.: US 8,626,599 B2
(45) Date of Patent: *Jan. 7, 2014

(54) PAYMENT PROCESSING SYSTEM DEBT CONVERSION NOTIFICATION

(75) Inventors: Richard Mitchell Eastley, Woodside, CA (US); Nancy Weber, San Francisco, CA (US); Tamara Romanek, Burlingame, CA (US); Sharon North, San Carlos, CA (US)

(73) Assignee: Visa U.S.A. Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/228,990

(22) Filed: Sep. 9, 2011

(65) Prior Publication Data
US 2012/0072337 A1 Mar. 22, 2012

Related U.S. Application Data

(63) Continuation of application No. 11/936,475, filed on Nov. 7, 2007, now Pat. No. 8,041,634.

(60) Provisional application No. 60/865,836, filed on Nov. 14, 2006.

(51) Int. Cl.
*G06Q 30/00* (2012.01)
(52) U.S. Cl.
USPC .......................................................... 705/26.1
(58) Field of Classification Search
USPC ........................................ 705/34, 35–45, 26
See application file for complete search history.

(56) References Cited

U.S. PATENT DOCUMENTS

| | | | |
|---|---|---|---|
| 6,311,170 B1 * | 10/2001 | Embrey | ........................ 705/40 |
| 6,882,983 B2 | 4/2005 | Furphy et al. | |
| 7,206,768 B1 | 4/2007 | deGroeve et al. | |
| 2002/0147685 A1 | 10/2002 | Kwan | |
| 2003/0018574 A1 | 1/2003 | Shumway | |
| 2004/0034544 A1 | 2/2004 | Fields et al. | |
| 2004/0167851 A1 | 8/2004 | Knowles et al. | |
| 2004/0199467 A1 | 10/2004 | Martin, Jr. et al. | |
| 2005/0010483 A1 | 1/2005 | Ling | |
| 2005/0192901 A1 * | 9/2005 | McCoy et al. | ................. 705/40 |
| 2005/0283432 A1 | 12/2005 | Reid et al. | |
| 2007/0040015 A1 | 2/2007 | Carlson et al. | |
| 2007/0203853 A1 | 8/2007 | Gindi | |

(Continued)

OTHER PUBLICATIONS

Short, Sharon Gwyn. "Beyond digital wallets: Internet payment services as Ecommerce boom or bust." EContent Apr. 1, 2000 (5 pages).*

(Continued)

*Primary Examiner* — Elda Milef
(74) *Attorney, Agent, or Firm* — Kilpatrick Townsend & Stockton LLP

(57) ABSTRACT

When a buyer's debt to a seller cannot be paid using an account issued to the buyer by an issuer within a payment processing system, then either or both the seller and the buyer are solicited to conduct future transactions payable on the account. If the debt can be paid using the account, then a sub-account is created unique to the seller and buyer. Transactions between the buyer and seller can be processed using the sub-account including the option of aggregating the debts prior to the processing. The credit limit of the sub-account can be set to match the amount of the aggregated debts.

23 Claims, 6 Drawing Sheets

(56) References Cited

U.S. PATENT DOCUMENTS

| | | |
|---|---|---|
| 2007/0214080 A1 | 9/2007 | Babi et al. |
| 2007/0226138 A1* | 9/2007 | Koltnow et al. ............ 705/40 |
| 2007/0282743 A1 | 12/2007 | Lovelett et al. |
| 2008/0016003 A1 | 1/2008 | Hutchison et al. |
| 2008/0275812 A1 | 11/2008 | Stone |

OTHER PUBLICATIONS

"eCharge Latest Challenger to Visa, MasterCard on Web;" Card News Aug. 25, 1999; 3 pages.

Chinese First Office Action, Chinese Application No. 200780048140.4, dated May 25, 2011, 6 pages.

Chinese Second Office Action, Chinese Application No. 200780048140.4, dated Apr. 13, 2012, 8 pages.

European Extended Search Report, European Application No. 07864142.0, dated Dec. 22, 2010, 5 pages.

European First Office Action, European Application No. 07864142.0, dated Nov. 30, 2011, 5 pages.

PCT International Search Report and Written Opinion, PCT Application No. PCT/US 07/84126, mailed Apr. 28, 2008, 10 pages.

Rejection Decision of Chinese Patent Application No. 200780048140.4, dated Jan. 14, 2013, 7 pages.

* cited by examiner

PAYMENT PROCESSING SYSTEM DEBT CONVERSION NOTIFICATION

CROSS-REFERENCES TO RELATED APPLICATIONS

This application is a continuation of U.S. patent application Ser. No. 11/936,475, filed Nov. 7, 2007, entitled "PAYMENT PROCESSING SYSTEM DEBT CONVERSION NOTIFICATION", which claims benefit under 35 U.S.C. §119(e) to U.S. Provisional Patent Application No. 60/865,836 filed Nov. 14, 2006, entitled "TRANSACTION PROCESSING AUTOMATION"," the disclosures of which are hereby incorporated by reference in their entirety for all purposes.

FIELD

Implementations generally relate to processing of payments, and more particularly, to automatically processing a buyer-to-seller payment and reconciling a remitted buyer-to-seller payment with accounting documents of the buyer-to-seller payment.

BACKGROUND

Businesses often process their transactions with other businesses through various means of payment types, such as by a credit account, a checking account, or an Automated Clearing House (ACH) credit transfer. For example, a buyer may have a purchase order (PO) for a seller disclosing the goods the buyer wishes to purchase. The PO may have several payment types associated with it depending on such factors as contractual obligations or credit limits. Consequently, the buyer may pay for certain goods using a check while paying for other goods with a credit card. Similarly, multiple POs may have multiple payment types.

Typically, PO or invoice payments are processed manually. The buyer may look through an accounts payable file and, based on the payment type, write checks to a seller, request the seller to charge a credit card, or prepare a money order for the seller, for example.

The process of manually determining the payment type for a payment, choosing between different systems that process the payment type, and disseminating the payment request through the different systems can become cumbersome to track, reconcile, and control. For example, each PO may be processed separately, resulting in inefficiencies as multiple payments are made to the same buyer during a window of time.

Some organizations utilize an Enterprise Resource Planning (ERP) system which typically integrates data into a single unified system within the organization, such as by storing the accounts payables of the organization into a single database. The ERP system can assist in organizing the accounts payables of the buyer or the accounts receivables of the seller; however, the ERP system does not automatically process each payment type through the different systems nor does the ERP automatically reconcile remitted payments to the corresponding invoices and/or POs.

Moreover, certain payment types may have advantages that may be underutilized when buyers or sellers process their accounts payables or accounts receivables in-house. For example, an account such as a credit account, within a payment processing system may have remittance guarantees or conditional incentives that may be beneficial to the business owner. The seller may prefer payments made on an account within the payment processing system because the payment processing system may facilitate remittance of the payment within a period of time or provide promotions options that increase the sales of the seller. The buyer may prefer payments made on the account because the account may be part of a loyalty program such that the buyer can receive a benefit by utilizing the account when conducting transactions. In a business-to-business transaction, the loyalty program may include cash back, insurance coverage for goods purchased, or frequently flyer miles, for examples. These benefits may be underutilized because the buyer or the seller engaged in trade may not be aware of the capability of the other to process the transaction on the account or the buyer or the seller may not know of the other's preference.

There is a need for a system in which the processing of payment obligations from the buyer to the seller can be automated. This and other problems, individually and collectively, are addressed herein.

SUMMARY

Automated processing of payments between a buyer and a seller are addressed in computer implemented methods described for a payment processing system, wherein a transaction handler processes a transaction characterized by a consumer and a merchant engaging in the transaction upon an account within the payment processing system.

In one computer method implementation, a debt of a consume to a seller is received and includes a seller identifier. A determination is made, using the seller identifier, whether the seller is one of the merchants within the payment processing system. If the seller is not one of the merchants, a first notice is addressed to the consumer seeking collaboration from the consumer to ask the seller to become one of the merchants in the payment processing system. If the seller is one of the merchants, a second notice is addressed to the consumer requesting the consumer to have the issuer issue, within the account, a sub-account that is unique to the seller, for making a future transaction between the consumer and the seller payable upon the sub-account. A confirmation is received that the issuer has issued the sub-account for the seller that is one of the merchants, wherein the confirmation includes an indicator for the sub-account. The future transaction between the consumer and the seller, that is one of the merchants, including the indicator for the sub-account is received. The future transaction is validated as being payable upon the sub-account using the indicator for the sub-account. The issuer is notified of the future transaction that is payable upon the sub-account.

In another implementation, at least one debt of the consumer to a single or several merchants are received, wherein each of the debts includes a corresponding merchant identifier for each of the merchants. For each of the merchant identifiers, a first notice is addressed to the consumer requesting the consumer to have the issuer issue, within the account, a sub-account that is unique to the corresponding merchant for making a future transaction payable upon the sub-account. For each of the sub-accounts: a confirmation that the issuer has issued the sub-account is received; each of the debts to the corresponding respective merchant is aggregated; a credit limit for the sub-account is set matching the aggregated debts to the corresponding merchant; a second notice is addressed to the corresponding merchant requesting the corresponding merchant to form a transmission including an indicator for the sub-account in conjunction with the future transaction; the indicator for the sub-account in conjunction with the future transaction is received; the future transaction is validated as being payable upon the sub-account using the indicator for the sub-account; and the issuer is notified that the future transaction is payable upon the sub-account. Alternatively or in combination, the credit limit for the sub-account may be set matching a portion of the debts. The setting of the credit limit of the sub-account may be based on factors such as clearing of the future transaction, completion of an enablement period for the credit limit of the sub-account, an account cycle of the sub-account, or a balance of the sub-account.

In yet another implementation, a debt of a buyer to a merchant is received, where the debt includes a buyer identifier for the buyer. Using the buyer identifier, a determination is made as to whether the buyer is one of the consumers within the payment processing system. If the buyer is not one of the consumers, a first notice is addressed to the merchant seeking permission from the merchant to ask the buyer to become one of the consumers in the payment processing system. If the buyer is one of the consumers: a second notice is addressed to the one of the consumers requesting the one of the consumers to have the issuer issue, within the corresponding account, a sub-account that is unique to the merchant for making a future transaction between the one of the consumers and the merchant payable upon the sub-account; a confirmation is received that the issuer has issued the sub-account including an indicator for the sub-account; the future transaction between the one of the consumers and the merchant including the indicator for the sub-account is received; the future transaction is validated as being payable upon the sub-account using the indicator for the sub-account; and the issuer is notified that the future transaction between the one of the consumers and the merchant is payable upon the sub-account.

In a still further implementation, debts owed to a merchant by several consumers are received, wherein each debt includes a corresponding consumer identifier for each of the consumers. A first notice is addressed to each of the consumers requesting each of the consumers to have the corresponding issuer issue a sub-account that is unique to the merchant for making a future transaction payable upon the sub-account, wherein the sub-account is associated with the account. For each of the sub-accounts: each of the debts of the corresponding consumer to the merchant is aggregated; a credit limit for the sub-account is set to match the aggregated debts of the corresponding consumer to the merchant; a notification is addressed to the merchant requesting the merchant to form a transmission including an indicator for the sub-account in conjunction with the future transaction; the indicator for the sub-account in conjunction with the future transaction is received; the future transaction is validated as being payable upon the sub-account using the indicator for the sub-account; and the issuer is notified that the future transaction is payable upon the sub-account. Moreover, based on factors such as clearing of the future said transaction, completion of the enablement period for the credit limit of the sub-account, the account cycle of the sub-account and the balance of the sub-account, the credit limit of the sub-account may be adjusted to match a remaining outstanding balance of the debts.

BRIEF DESCRIPTION OF THE DRAWINGS

Implementations will become more apparent from the detailed description set forth below when taken in conjunction with the drawings, in which like elements bear like reference numerals.

DETAILED DESCRIPTION

In one implementation, a debt, such as a bill or a purchase order, of a buyer to a seller is automatically processed. A file containing the debt is analyzed to determine a payment type that the debt is to be made payable on, such as by check or credit card. If the payment type is other than an account within a payment processing system (e.g., credit account or debit account), either or both the seller and the buyer are solicited to conduct transactions payable on the account. If the payment type is on the account, then a sub-account is created for the seller and buyer. Transactions between the buyer and seller are then processed using the sub-account including the options of: aggregating a plurality of the debts of the buyer to the seller and processing the transaction in the amount of the aggregated debts payable on the sub-account, making the debt payable upon the sub-account, or making a portion of the debt payable upon the sub-account. The credit limit of the sub-account can be set to match the amount of the aggregated debts, the debt, or the portion of the debt. Alternatively or in combination, based on factors such as clearing of the transactions, completion of the enablement period for the credit limit of the sub-account, the account cycle of the sub-account and the balance of the sub-account, the credit limit of the sub-account may be adjusted to match a remaining outstanding balance of the debt.

As utilized herein, a buyer is a person or entity that leases, licenses, or purchases a good, service, or both from a seller. The seller may be a person or entity that leases, licenses, or sells the good, service, or both to the buyer. Each of the buyer or the seller may be a business entity engaged in a business-to-business trade or an individual engaged in individual-to-individual trade. Moreover, individual-to-business or business-to-individual trade is also disclosed herein. A consumer is a buyer that has an account within the payment processing system and a merchant is a seller that accepts payments upon the account within the payment processing system. The payment processing system is a system in which a transaction handler processes multiple transactions that are each characterized by the consumer and the merchant engaging in one of the transactions upon the account within the payment processing system. In the payment processing system, an issuer issues the account to the consumer, and the merchant submits one of the transactions to an acquirer for processing by the transaction handler who requests the issuer to disburse funds from the consumer for the transaction. The issuer forwards the funds to the transaction handler who forwards the funds to the acquirer to disburse the funds to the merchant for the transaction. See Infra The Payment Processing System for a more detailed description of the payment processing system.

Figure 1:
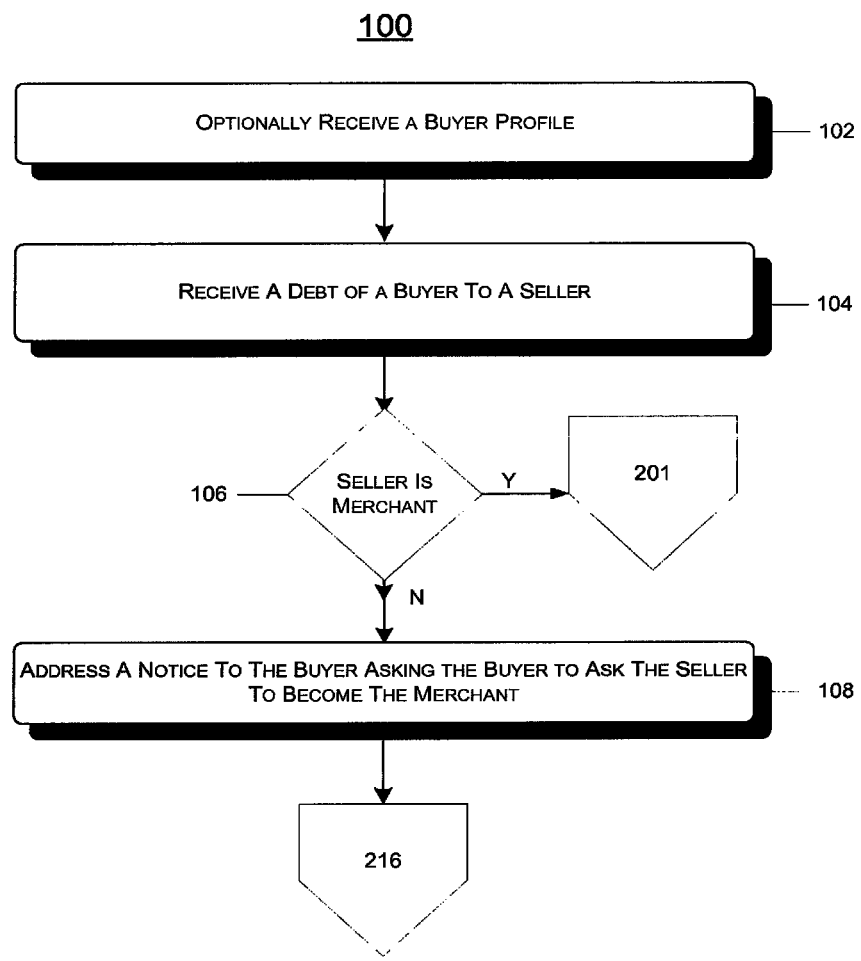
FIG. 1 is flow diagram illustrating an exemplary method through which a debt (e.g., indicia of a monetary obligation) of a buyer to a seller may be processed.
Figure 2:
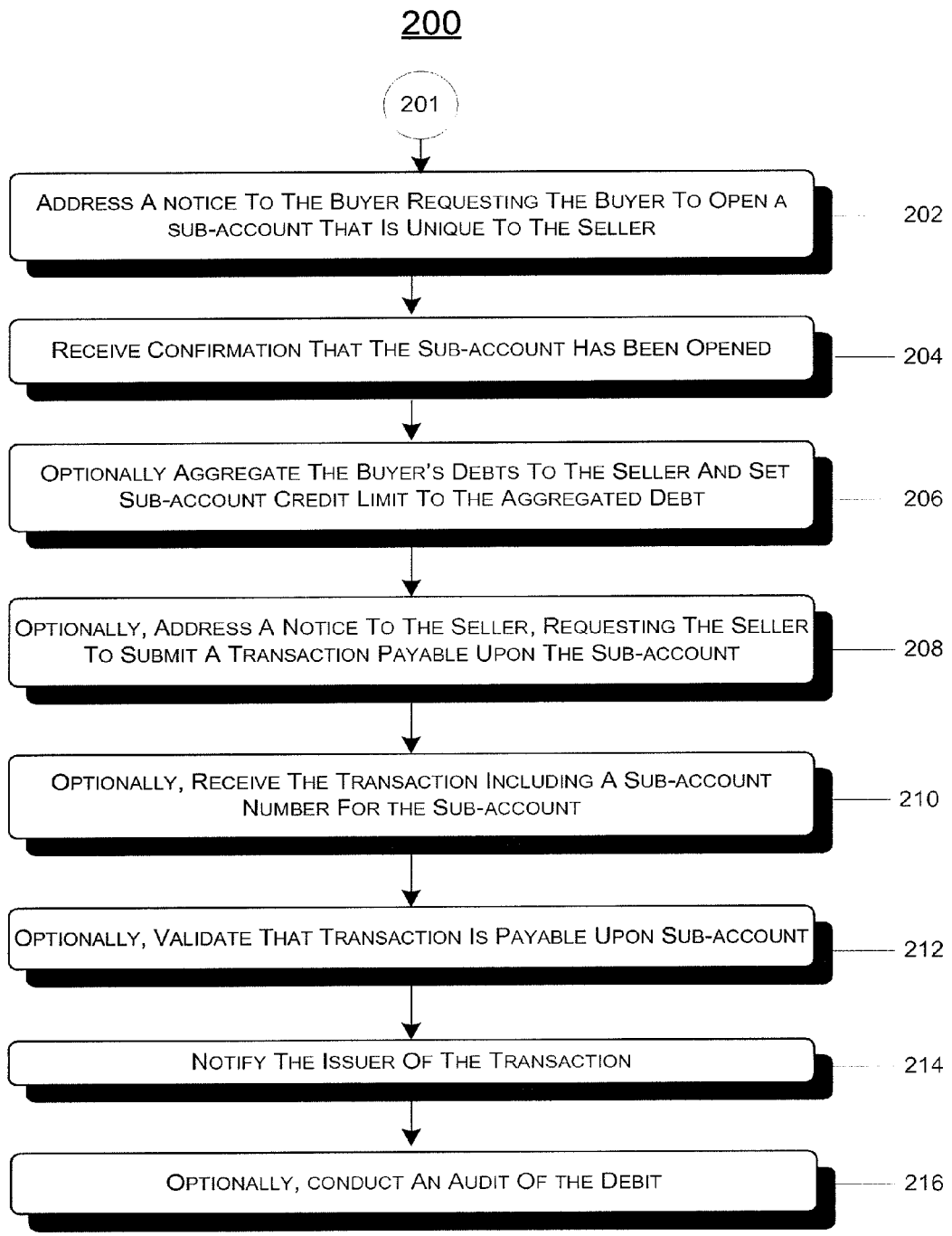
FIG. 2 is flow diagram illustrating an exemplary method through which a debt of the buyer to the seller may be processed using an account within a payment processing system.

Referring to FIGS. 1 and 2, two flow diagrams illustrate an exemplary method through which at least one debt of a buyer to a seller may be processed.

In one implementation, the debt of the buyer is processed for the buyer that is one of the consumers. At step 102, at a process 100, a buyer profile including information on a plurality of the sellers that the consumer typically does business with may be optionally received from the consumer. The information may include for each seller: a name, an address, a deposit account number, a seller identifier (e.g., a code for the seller), a description of the seller, past payment amounts to the seller, a payment cycle indicating the date on which payments are typically made to the seller, a name of the acquirer associated with the seller, a form of payment that the seller accepts, or a category of the seller, for example.

At step 104, a debt of the consumer to at least one of the sellers is received. The debt may be a bill, an accounts payable document, an electronic accounts payable file generated by the ERP of the consumer, a purchase order, or an invoice for example. The debt may include data on a single bill of a single seller, a plurality of bills of a single seller, or a plurality of bills of a plurality of sellers. The debt may include, for each seller: an amount owed to the seller, when the debt is due to the seller, the seller identifier, a buyer identifier, or the payment type that each of the debts can be made payable upon.

At step 106, a determination is made as to whether each of the sellers are one of the merchants. If the debt is for a plurality of amounts owed (e.g., multiple bills), the determination is made for each of the amounts owed.

For each of the sellers, the corresponding seller identifier can be used to determine if the seller is one of the merchants. The seller identifier received in the debt can be matched with a merchant identifier for the seller stored in a server database that links the merchant identifier with information denoting whether the seller is one of the merchants within the payment processing system. To illustrate, if the debt includes "CCX-WYX" as the seller identifier and the merchant identifier for the seller in the server database is "CCXWYX" then there is a match and the seller is one of the merchants. Other forms of matching schema are well known in the art.

Another means to determine if the seller is one of the merchants is to utilize the data within the debt. As stated previously, the debt may include the payment type accepted by the seller. For example, the debt may indicate that the seller accepts credit card payments. Consequently, the seller is one of the merchants because the seller accepts payments on the account. The payment type within the debt can be validated or trumpeted with data in the server database that links the merchant identifier with the information denoting whether the seller is one of the merchants. For example, if there is a discrepancy between the payment type within the debt and the match between the seller identifier and the merchant identifier, the determination of whether the seller is one of the merchants can be based on the match rather than the payment type indicated in the debt.

When the seller is a merchant, process 100 jumps to a step 201 of process 200 seen in FIG. 2. Otherwise, the seller is not one of the merchants and, at step 108, a notice is addressed to the consumer seeking collaboration from the consumer to ask the seller to become one of the merchants. The notice may include a name of the seller, a description denoting that the seller does not currently accept payments on the account, a request that the consumer approve solicitation of the seller to become one of the merchants, or a request for information on how to solicit the seller to become one of the merchants. The collaboration of the consumer may be consent to solicit the seller. For example, the consumer may consent to an anonymous letter being sent to the seller indicating the benefits of becoming one of the merchants; alternatively, the letter may not be anonymous, indicating that the consumer has the account and prefers that the debt to the seller be paid using the account. Other forms of solicitation are well known to one of ordinary skill in the art.

The seller may indicate that the seller wishes to become one of the merchants. For example, the seller may receive the solicitation and decide that the seller may start accepting payments on the account. The seller may enter into a binding agreement with the transaction handler or the acquirer, for example, to begin accepting funds made payable upon the account.

A notification that the seller has become one of the merchants can be received. For example, the transaction handler may receive the notification that the seller has become one of the merchants and that a Wells Fargo® bank has become the acquirer associated with the seller. The seller may update the ERP of the seller to reflect the change in the payment type that the seller accepts or obtain equipment to be able to process payments upon the account such as obtaining software that can form a transmission containing magnetic stripe formatted transaction information containing the transaction. Using the software, the seller may be able to transmit to the acquirer to forward to the transaction handler transaction information including: transaction currency amount, the name of the seller, the name of the consumer, the date of the transaction, the date of the transmission, a number for the purchase order associated with the transaction, a number for the invoice associated with the transaction, a description of the goods or services rendered, or the quantity of goods or services rendered. For example, the seller may form a transmission requesting payment of the debt upon the account indicating the amount owed and the number of the purchase order.

If the seller is not one of the merchants, the debt can be processed without using the account. For example, a transmission can be formed requesting a financial institution, such as a bank, to: submit a check from the consumer to the seller having a value matching the debt from the consumer to the seller; submit a money order from the consumer to the seller having the value matching the debt from the consumer to the seller; or submit an Automated Clearing House credit transfer from the consumer to the seller having the value matching the debt from the consumer to the seller. Other forms of payment are well known to one of ordinary skill in the art (e.g., a traveler's check, direct bank transfer, cash, or point transfer of points having a currency value). For example, a financial message may be sent between members (e.g., banks, broker dealers, or investment manages) of a financial messaging service within a co-operative of financial institutions requesting a money transfer from the consumer to the seller having the value matching the debt from the consumer to the seller. An example of such a co-operative is the Society for Worldwide Interbank Financial Telecommunication (SWIFT®) co-operative.

The matching of the value to the debt may occur in a plurality of ways. For example, the value may equal each of the amounts owed in the debt to the corresponding seller, the value may equal a portion of each of at least one of the amounts owed in the debt to the corresponding seller, the value may equal an aggregate of the amounts owed in the debt for the corresponding seller, the value may equal an aggregate of the plurality of amounts owed to the corresponding seller in the plurality of the debt, the value may equal an updated debt that was received after the receipt of a previous debt, or the value may equal to the amount owed in the debt plus other charges such as tax thereupon or shipping and handling of the goods purchased with the amount owed.

If the seller is one of the merchants, the sub-account specific to the seller and consumer within the account can be opened. For each of the sellers, the amounts owed in the debt to each of the sellers can be aggregated (e.g., over a window of time) prior to processing a future transaction for the aggregated debt to the corresponding seller. Moreover, an audit can be conducted reconciling records of a remitted payment of the future transaction and the debt to the seller.

At step 202 of FIG. 2, a notice is addressed to the consumer to open a sub-account within the account that is specific to the consumer and the seller that is one of the merchants. The notice to open the sub-account may indicate a request for the consumer to contact the issuer of the consumer to issue a sub-account associated with the account such that future transactions can be made payable upon the sub-account when both the consumer and the seller that is one of the merchants are engaged in the future transaction. For example, if the sub-account is issued to the consumer for a first seller, the future transaction can not be made payable upon the sub-account if the future transaction is between the consumer and a second seller.

At step 204, a confirmation is received indicating that the sub-account that is specific to the consumer and to the seller that is one of the merchants has been issued by the issuer to the consumer. The confirmation may include: the name of the consumer, a name for the issuer that issued the sub-account, an indicator for the sub-account (e.g., a sub-account number), the name of the seller that is one of the merchants, or a credit limit of the sub-account.

At step 206, if there is a plurality of amounts owed within the debt (or within a plurality of the debts), the amounts owed to the seller that is one of the merchants is aggregated. For example, the debt may include ten bills of the first seller that is Boeing Company and eight purchase orders to the second seller that is General Mills, Inc. The amount owed for each of the ten bills of the Boeing Company can be aggregated to equal a sum total of the amounts owed to the Boeing Company. Moreover, the amount owed for each of the purchase orders to General Mills, Inc. can be aggregated to equal a sum total of the amounts owed to the General Mills, Inc.

The credit limit of the sub-account can be set to match the debt, the portion of the debt, or aggregated amounts owed to the seller that is one of the merchants. For example, the plurality of debts received from the consumer that is American Airlines, Inc. may include bills received from the Boeing Company over the course of one month. The sum total of the amounts owed for the month may equal $530,000 (U.S.). The credit limit of the sub-account of American Airlines, Inc. for the Boeing Company may be increased from $500,000 (U.S.) that was the credit limit for the sub-account for the Boeing Company the previous month to $550,000 (U.S.) to match the aggregated amounts owed of $530,000 (U.S.). In order to match the aggregated amounts owed, the credit limit need not to be equivalent to the aggregated amounts owed. For example, the credit limit may be a percentage more than the aggregated amounts owed taking into consideration processing fees or other charges that may be made on the account not reflected in the aggregated amounts owed. Alternatively, or in combination, the credit limit may be reset to zero or another value during the account cycle. For example, The credit limit of the American Airlines, Inc. for the Boeing Company may have been set to $500,000 (U.S.) at the previous month, reset to zero at the end of the previous month, and set a second time to $550,000 (U.S.) the month after the previous month.

At step 208, a notice is optionally addressed to the seller that is one of the merchants to submit a future transaction requesting payment upon the sub-account, wherein the future transaction is characterized by the consumer and the seller that is one of the merchants engaging in the future transaction. The future transaction may be for the amount owed or the aggregated amounts owed. To illustrate using the previous example, the notice may be addressed to the Boeing Company indicating that the Boeing Company may charge the sub-account for the $530,000 (U.S.) or any other future transactions between the American Airlines, Inc. and the Boeing Company. The notice may include: the indicator for the sub-account, an expiration date of the indicator for the sub-account, the amount owed, the aggregated amount owed, the date by which the future transaction should be transmitted, the number for the purchase order associated with the amount owed, or the number for the invoice associated with the amount owed.

At step 210, the future transaction is optionally received, such as the future transaction for funds matching the amount owed or the aggregated amount owed. For example, the transaction handler may receive the future transaction from the acquirer associated with the seller that is one of the merchants wherein the transaction handler can request the issuer to disburse funds matching the amount owed from the consumer. The transmission of the future transaction may include: the quantity of funds requested, the indicator for the sub-account, a purchase order identifier (e.g., the number for the purchase order) associated with the debt (or the amount owed in the debt) to the seller, or an invoice order identifier (e.g., the number for the invoice) associated with the debt (or the amount owed in the debt) to the seller. The future transaction may be in a magnetic stripe format.

At step 212, a validation is optionally made as to whether the future transaction is payable on the sub-account. The indicator for the sub-account received in future transaction can be compared to a plurality of indicators for a plurality of sub-accounts stored within the server database to determine if the consumer and the seller engaged in the future transaction match the consumer and the seller unique to the sub-account. Consequently, if the issuer issued the sub-account to the consumer that is Starbucks Coffee Company (or affiliates thereof) for the seller that is Apple Computer, Inc. (or affiliates thereof) the future transaction is validated as payable upon the sub-account if the data in the received future transaction indicates that the consumer and the seller engaged in the future transaction are the Starbucks Coffee Company (or affiliates thereof) and the Apple Computer, Inc. (or affiliates thereof) respectively. A matching algorithm may be used to determine the match between the future transaction and data in the server database. For example, the server database may have information on a company and the affiliates thereof. To illustrate, if the sub-account is unique to Starbucks Coffee Company, and the future transaction is between Starbucks Coffee Trading Co. that is an affiliate of Starbucks Coffee Company, and Apple Computer, Inc., then the matching algorithm would return a match and the future transaction is validated as payable on the sub-account.

At step 214, the issuer is notified that the future transaction is payable upon the sub-account. The issuer may be notified by a transmission including: the amount owed, the aggregated amounts owed, the name of the seller, the name of the consumer, the date of the future transaction, or a request to disburse funds from the consumer for the future transaction, wherein the issuer can forward the funds to the transaction handler who forwards the funds for the future transaction to the acquirer to disburse the funds to the seller that is one of the merchants.

The issuer can be notified that the future transaction is payable upon the sub-account, without the steps of addressing a notice to the seller to submit the future transaction, receiving the future transaction in the transmission, or validating that the future transaction is payable upon the sub-account, for example. The consumer and the seller may agree that the debt is sufficient indication of an intent of the seller to make the amount owed in the debt payable on the sub-account. The issuer may be notified of the future transaction at predetermined periods or predetermined amounts. To illustrate, the consumer and the seller may agree that the aggregated amounts owed to the seller should be processed by notifying the issuer of the future transaction at the first of each month or whenever the aggregated amounts owed in the debt is equal to or greater than $500 (U.S.). Alternatively, or in combination, the consumer and the seller may agree that each debt to the seller should be processed when received such that the issuer is notified of the future transaction for funds equal to the amount owed in the debt at the time the debt is received. To illustrate, the transaction handler may intermittently receive debt which is an accounts payable file from the ERP of the consumer. The consumer and the seller having a bill that is included in the accounts payable file may have pre-arranged that all the bills are paid upon receipt of the accounts payable file from the ERP of the consumer by the transaction handler. Consequently, in this example, upon receipt of the accounts payable file containing the bill, the transaction handler may form a transmission to the issuer notifying the issuer to disburse funds equal to the amount owed in the bill of the seller.

At step 216 of FIG. 2, an optional audit of the debt can be conducted. For example, when the seller is one of the merchants, the audit can occur by reconciling the funds that were disbursed via the account with the amount owed in the debt. The reconciliation may include matching data received in the transmission of the future transaction with the debt. The matching may include determining a correspondence, such as an equivalence, between: a first identifier of the purchase order included in the transmission of the future transaction with a second identifier of the purchase order associated with the debt (or the amount owed within the debt); a first identifier of the invoice included in the transmission of the future transaction with a second identifier of the invoice associated with the debt; or the value of the funds that were disbursed with the debt. Alternatively, or in combination, the audit of the debt can occur by reconciling data received from the issuer or received from the acquirer during the clearing or settling process of the funds distribution. For example, when the issuer forwards funds to the transaction handler, the forwarded funds can also include the indicator of the purchase order that is reconciled with the indicator of the purchase order associated with the amount owed in the debt of the consumer to the seller.

Similarly, if the seller is not one of the merchants, the audit can occur by reconciling a currency quantity submitted to the seller with the amount owed to the corresponding seller in the debt of the consumer. For example, the currency quantity of the check from the consumer to the seller can be reconciled with the amount owed in the debt of the consumer to the corresponding seller; the currency quantity of the money order from the consumer to the seller can be reconciled with the amount owed in the debt of the consumer to the corresponding seller; or the currency quantity of the Automated Clearing House credit transfer from the consumer to the seller can be reconciled with the amount owed in the debt of the consumer to the corresponding seller.

The result of the audit can be transmitted to the consumer, the issuer, the acquirer, or the seller. For example, the consumer may receive a report indicating that all of the amounts owed in each of the debts of the consumer has been reconciled with the received transmissions of the future transactions such that funds disbursed via each sub-account to the corresponding sellers matched the amounts owed to the corresponding respective sellers in the debt of the consumer. Consequently the information in the report of the audit may include: the amount owed; the value; the first purchase order identifier; the second purchase order identifier; the first invoice identifier; the second invoice identifier; whether the first purchase order identifier was equivalent to the second purchase order identifier; whether the first invoice identifier was equivalent to the second invoice identifier; or whether the value was equivalent to the amount owed.

In another implementation, a plurality of debts of the buyer that is one of the consumers to a plurality of the sellers that are each one of the merchants is processed. The plurality of the debt is received including the corresponding respective merchant identifiers (the step 104). For each of the merchant identifiers, a first notice is addressed to the consumer requesting the consumer to have the issuer issue the sub-account that is unique to the corresponding merchant for making the future transaction payable on the sub-account, wherein the sub-account is associated with the account within the payment processing system (the step 202).

For each sub-account, a confirmation is received indicating that the issuer issued the sub-account (the step 204). The debts to the corresponding respective merchant is aggregated and the credit limit of the sub-account is set to match the aggregated debts (the step 206). A second notice is sent to the corresponding merchant requesting the corresponding merchant to form a transmission including the indicator for the sub-account in conjunction with the future transaction (the step 208). The transmission including the indicator for the sub-account and the future transaction is received (the step 210). The future transaction is validated as being payable on the sub-account (the step 212), the issuer is notified that the future transaction is payable upon the sub-account (the step 214), and the audit is conducted (the step 216).

The credit limit of the sub-account can be set at any point during the processing of the debt, for example as illustrated in FIGS. 1 and 2. In one implementation, the credit limit of the sub-account may be set to match the quantity of funds requested in the future transaction such as when the future transaction is received from the acquirer or a second quantity of the funds of the future transaction that has been cleared and settled that may be different from the quantity of funds requested. Alternatively, or in combination, the credit limit can be set at an activation period of the sub-account, or at another point in the account cycle.

For example, based on factors such as a clearing of the transaction, completion of an enablement period for the credit limit (e.g., a predetermined period of time that the credit limit is available to the consumer), a point or period of time within an account cycle of the sub-account or a balance of the sub-account, the credit limit of the sub-account may be set to match a remaining amount owed of the debts that may be outstanding after the future transaction has been processed for a portion of the debt. To illustrate, after receiving indicia that the future transaction has cleared and settled, the credit limit of the sub-account may be set to a value matching the a second portion of the debt, such as a remaining amount due to the corresponding respective merchant when the consumer does not pay for the full amount of the debt to the corresponding respective merchant in one transaction. In another example, after the future transaction is cleared and settled, the credit limit of the sub-account may be set to zero in preparation for another credit limit adjustment (e.g., setting of the credit limit) when another of the debts of the consumer to the seller is received.

Figure 3:
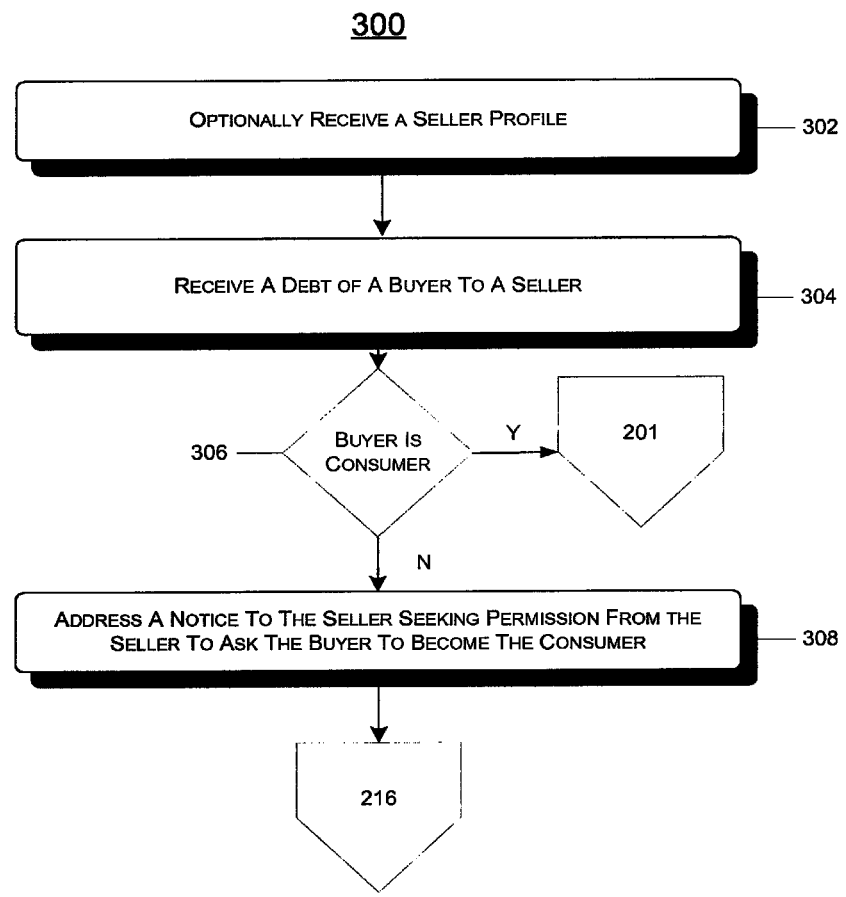
FIG. 3 is flow diagram illustrating an exemplary method through which a debt to a seller of a buyer may be processed.

In another implementation, the debt of at least one buyer to the seller is processed for the seller that is one of the merchants. Referring to FIGS. 2 and 3, the debt is received from the merchant; a determination is made as to whether the buyer is one of the consumers; if the buyer is not one of the consumers, the buyer is solicited to become one of the consumers; if the buyer is one of the consumers, a notice is addressed to the buyer to open a sub-account specific to the buyer and the merchant. The amounts owed to the merchant can be aggregated for each buyer and processed accordingly.

At step 302 of FIG. 3, the merchant may create a seller profile including information on a plurality of the buyers that the merchant typically does business with. The information may include for each buyer: the name of the buyer, an address of the buyer, an account number of the buyer, the buyer identifier (e.g., a code for the buyer), a description of the buyer, past payment amounts to the merchant, a payment cycle indicating the date on which payments are typically made by the buyer, a form of payment that the buyer makes payments payable upon, a name of the issuer associated with the buyer, or a category of the buyer.

At step 304, the debt to the merchant of at least one of the buyers is received. The debt may be a bill, an accounts receivable document, an electronic accounts receivable file generated by the ERP of the merchant, a purchase order, or an invoice for example. The debt may include data on a single bill to a single buyer, a plurality of bills to a single buyer, or a plurality of bills to a plurality of the buyers. The debt may include, for each buyer: an amount owed to the merchant, when the debt is due to the merchant, the merchant identifier, the buyer identifier, or the payment type that the debt can be made payable upon.

At step 306, a determination is made as to whether each of the buyers are one of the consumers. If the debt is for the plurality of amounts owed (e.g., multiple bills), the determination can be made for each of the amounts owed.

For each of the buyers, the corresponding buyer identifier can be used to determine if the buyer is one of the consumers. The buyer identifier received in the debt can be matched with a consumer identifier for the buyer stored in the server database that links the consumer identifier with information denoting whether the buyer is one of the consumers within the payment processing system.

Another means to determine if the buyer is one of the consumers is to utilize the data within the debt. The debt may include the payment type utilized by the buyer. For example, the debt may indicate that the buyer has a credit card account. As in the previous implementation, the debt can be validated or trumpeted with data in the server database that links the consumer identifier with the information denoting whether the buyer is one of the consumers.

When the buyer is already a consumer within the payment processing system, process 300 terminates and moves to the step 201 in Process 200 seen in FIG. 2. Otherwise, at step 308, the buyer is not one of the consumers and a notice is addressed to the merchant seeking collaboration from the merchant to ask the buyer to become one of the consumers. The notice may include: the name of the buyer; a description denoting that the issuer has not, to date, issued the account to the buyer; a request that the merchant approve solicitation of the buyer to become one of the consumers; or a request for information on how to solicit the buyer to become one of the consumers. The collaboration of the merchant may be to consent to solicit the buyer such as an anonymous letter or a letter to the buyer indicating that the merchant accepts funds disbursed via the account and prefers that the debt to the merchant be paid using the account.

The buyer may indicate that the buyer wishes to become one of the consumers. For example, the buyer may receive the solicitation and decide that the buyer wishes the issuer to issue the account to the buyer. The buyer may enter into a binding agreement with the transaction handler or the issuer, for example, to begin disbursing funds using the account.

A notification that the buyer has become one of the consumers can be received. The buyer may update the ERP of the buyer to reflect the change in payment type that the buyer will use to make payments toward the amount owed to the merchant or obtain equipment or software to be able to process payments upon the account.

As stated previously, the debt can be processed without using the account. For example, a request can be made to a financial institution, such as a bank, to: submit a check from the buyer to the merchant having a value matching the amount owed in the debt; submit a money order from the buyer to the merchant having the value matching the amount owed in the debt; submit an Automated Clearing House credit transfer from the buyer to the merchant having the value matching the debt, or submit a financial messaging service within a co-operative of financial institutions requesting a currency transfer from the consumer to the seller having the value matching the debt from the consumer to the seller. The buyer and the merchant may have agreed to having the debt processed without using the account. For example, the buyer may have given the transaction handler a checking account number of the buyer in order for the transaction handler to request the submission of the check from the buyer to the merchant.

If the buyer is one of the consumers, the sub-account specific to the buyer and merchant within the account can be opened. The amounts owed in the debt to the merchant can be aggregated for each buyer that is one of the consumers and the future transaction for the aggregated amounts owed in the debt can be processed. Moreover, an audit can be conducted reconciling records of a remitted payment of the future transaction and the debt to the merchant.

At step 202 of FIG. 2, a notice is addressed to the buyer, that is one of the consumers, to open a sub-account within the account that is specific to the buyer and the merchant. The notice to open the sub-account may indicate a request for the buyer to contact the issuer of the buyer to issue, in association with the account, a sub-account such that future transactions can be made payable upon the sub-account when both the merchant and the buyer, that is one of the consumers, engage in the future transaction.

At step 204, a confirmation is received that the sub-account has been issued. The confirmation may include: the name of the buyer, a name for the issuer that issued the sub-account, an indicator for the sub-account, the name of the merchant, or a credit limit of the sub-account, for example.

At step 206, if there is a plurality of the debt or a plurality of amounts owed within the debt, the amounts owed to the merchant is aggregated for each buyer that is one of the consumers. As stated previously, the credit limit of the sub-account can be set to match: the debt of the buyer to the seller, a portion of the debt of the buyer to the seller, the amount owed within the debt of the buyer to the seller, a portion of the amount owed within the debt of the buyer to the seller, or the aggregated amounts owed to the merchant by the buyer that is one of the consumers.

At step 208, a notice is optionally addressed to the merchant to submit a future transaction requesting payment upon the sub-account, wherein the future transaction is characterized by the buyer that is one of the consumers and the merchant engaging in the future transaction. The future transaction may be for the amount owed, the portion of the amount owed, or the aggregated amounts owed, for example. The notice may include: the indicator for the sub-account, an expiration date of the indicator for the sub-account, the amount owed, the aggregated amount owed, the date by which the future transaction can be transmitted, the number for the purchase order associated with the amount owed, or the number for the invoice associated with the amount owed.

At step 210, the future transaction for funds matching the amount owed or the aggregated amount owed is optionally received. For example, the transaction handler may receive the future transaction from the acquirer associated with the merchant wherein the transaction handler can request the issuer to disburse funds matching the amount owed from the buyer that is one of the consumers. The transmission of the future transaction may include: the quantity of funds requested, the indicator for the sub-account, the number for the purchase order associated with the amount owed, or the number for the invoice associated with the amount owed. As stated previously, at step 212, the validation is made as to whether the future transaction is payable on the sub-account and at the step 214, the issuer is notified of the future transaction that is payable on the sub-account. Moreover, as in the previous implementation, the issuer can be notified of the future transaction without the steps of addressing a notice to the merchant to submit the future transaction, receiving the future transaction in the transmission, or validating that the future transaction is payable upon the sub-account.

Referring to FIG. 2 at step 216, the debt of each buyer to the merchant can be audited to determine if the merchant received payment corresponding to each of the amounts owed in the debt to the merchant by each of the buyers.

In another implementation, a plurality of debts to the seller that is one of the merchants by a plurality of the buyers that are each one of the consumers is processed. The plurality of the debts is received including the corresponding respective consumer identifiers (the step 104). For each of the consumer identifiers, a first notice is addressed to the corresponding consumer requesting the corresponding consumer to have the corresponding issuer issue the sub-account that is unique to the corresponding consumer for making the future transaction payable upon the sub-account, wherein the sub-account is associated with the account within the payment processing system (the step 202).

For each sub-account, the debts of the corresponding respective consumer is aggregated and the credit limit of the sub-account is set to match the aggregated debts (the step 206). A second notice is sent to the merchant requesting the merchant to form the transmission including the indicator for the sub-account in conjunction with the future transaction (the step 208) with the corresponding consumer. The transmission including the indicator for the sub-account and the future transaction is received (the step 210). The future transaction is validated as being payable on the sub-account (step 212) and the issuer is notified that the future transaction is payable upon the sub-account (the step 214).

The sub-account can be disassociated from the corresponding seller and associated with another of the sellers after the future transaction has been cleared and settled. For example, after notifying the issuer that the future transaction is payable upon the sub-account and after the future transaction has been completed such that the seller involved in the future transaction is paid the funds, the sub-account can be disassociated from the seller that has been paid and associated with another of the sellers for making a second future transaction between the consumer and the another seller payable upon the sub-account. To illustrate, Sears Holdings Corporation ("Sears") may have a sub-account that it can charge payments to Black & Decker Corporation upon having an account number as "12345." Subsequent to transferring of funds for amounts owed to the Black & Decker Corporation, Sears may request the issuer of the sub-account of Sears to disassociate the sub-account with the account number "12345" from the Black & Decker Corporation and then associate the sub-account with another seller that is General Electric Company.

Figure 4:
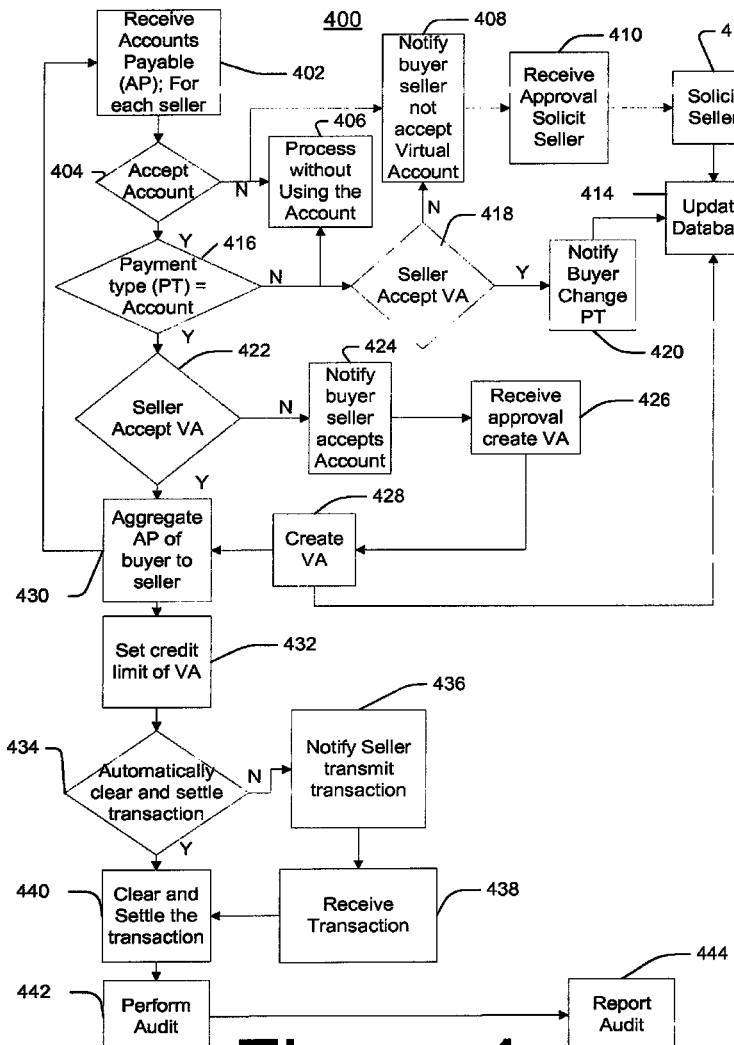
FIG. 4 shows a block diagram of an exemplary method through which an accounts payable to a seller of the buyer may be processed.

Referring to FIG. 4, in yet another implementation the accounts payable of a buyer is processed and reconciled in a method 400. At step 402 an accounts payable file of the buyer having the accounts payable for multiple sellers and their corresponding respective PO numbers is received. The remainder of the method 400 is conducted for each seller within the accounts payable file. At the query 404, a determination is made as to whether the seller accepts payments upon the account within the payment processing system. For example, the server database is accessed to determine if the seller within the accounts payable file is one of the merchants. As stated previously, if the seller identifier and the merchant identifier are matched, then the seller accepts payments made payable upon the account. If the determination of the query 404 is no, the seller does not accept payments made payable upon the account, then the accounts payable is processed through means other than the account at step 406. Moreover, at step 408, the buyer is notified that the seller is not accepting payments made payable upon a virtual account associated with the account that is unique to the buyer and the seller, such as the sub-account. At step 410 the approval from the buyer to solicit the seller to accept payments made payable upon the virtual account is received. In Step 412, the seller is solicited to accept payments made payable upon the virtual account for the future transaction between the buyer and the seller. In Step 414, the server database is updated to reflect the change that the seller accepts payments made payable upon the virtual account.

If the determination of the query 404 is yes, the seller does accept payments made payable upon the account, then a second query, a query 416 is posed. At the query 416, the accounts payable file indication of the payment type is determined. If the payment type within the accounts payable file does not indicate that the seller accepts payment made payable upon the account, then step 406 denotes that the accounts payable is processed through means other than utilizing the account. Moreover, at a query 418, a determination is made as to whether the seller accepts payments made payable upon the virtual account. If the query 418 indicates that the seller does not accept payments made payable upon the virtual account, then the buyer is notified in the step 408 that the seller does not accept payments upon the virtual account, (the step 410) approval is received to solicited the seller, (the step 412) the seller is solicited to accept payments made payable upon the virtual account, and (the step 414) the server database is updated to reflect that the seller now accepts payments made payable upon the account.

If a result of the query 418 is that the seller does accept payments made payable upon the virtual account, then in a step 420, the buyer is notified to change the payment type within the accounts payables file to reflect that the seller accepting payments made payable upon the virtual account. In this implementation, the payment type stored in the server database trumps the payment type included in the accounts payable file. In the step 414, the server database is updated to reflect that the seller accepts payments upon the account.

If the result of the query 416 is that the seller does accept payments made payable upon the account, a query 422 is made. In the query 422, a determination is made as to whether the seller accepts payment made upon the virtual account. If a result of the query 422 is no, the seller does not accept payment upon the virtual account, then at a step 424, the buyer is notified that the seller accepts payments made payable upon the account, but has not accepted payments upon the virtual account. At a step 426, an approval is received from the buyer to create the virtual account that is unique to the buyer and to the seller. At a step 428, the virtual account is created that is unique for the buyer and the seller. Moreover, the information in the server database is updated to reflect the change that the seller accepts payments made payable upon the virtual account.

The accounts payable of the buyer to the seller can be aggregated. If the query 422 indicates that the seller accepts payments made payable upon the virtual account, then at a step 430, the accounts payable for the seller or the buyer is aggregated. At a step 432, a credit limit of the virtual account is adjusted or set to match the aggregated accounts payable of the buyer to the seller. At a query 434, a determination is made as to whether an automatic clearing and settling of the accounts payable has been preset. If the clearing and settling should occur automatically, then at the step 440 the future transaction for the amount of the aggregated accounts payable of the buyer to the seller is cleared and settled. However, if the query 434 indicates that the automatic clearing and settling has not been preset, then the seller is notified to form a transmission including the future transaction for the amount of aggregated accounts payable, requesting a clearing and settling of the aggregated amounts, and including the associated indicator of the PO in a step 436. At a step 438, the transmission of the future transaction for the amount of the aggregated accounts payable is received from the seller including the associated indicator of the PO. At a step 440, the future transaction for the amount of the aggregated accounts payable is cleared and settled.

At step 442, the accounts payable file that was received and the future transaction for the aggregated accounts payable is audited by means previously described. At step 444, the report on the audit is sent to either the buyer, the seller, or both.

In another implementation, a single or several debts of the consumer to a single or several merchants are received, wherein each of the debts includes a corresponding merchant identifier for each of the merchants. For each of the merchant identifiers, a first notice is addressed to the consumer requesting the consumer to have the issuer issue, within the account, the sub-account that is unique to the corresponding merchant for making a future transaction payable upon the sub-account. For each of the sub-accounts: a confirmation that the issuer has issued the sub-account is received; each of the debts to the corresponding respective merchant is aggregated; a credit limit for the sub-account is set matching the aggregated debts to the corresponding merchant; a second notice is addressed to the corresponding merchant requesting the corresponding merchant to form a transmission including an indicator for the sub-account in conjunction with the future transaction; the indicator for the sub-account in conjunction with the future transaction is received; the future transaction is validated as being payable upon the sub-account using the indicator for the sub-account; and the issuer is notified that the future transaction is payable upon the sub-account. Subsequently, based on factors such as transaction clearing, completion of the enablement period for the credit limit, account cycle and account balance, further adjustments to the credit limit can be made to reflect remaining outstanding debts. Following completion of use of the sub-account for the single or several debts of the consumer to the corresponding respective merchant, the sub-account may be reused for another of the merchants after a specified period of time, for example.

The Payment Processing System

Figure 5:
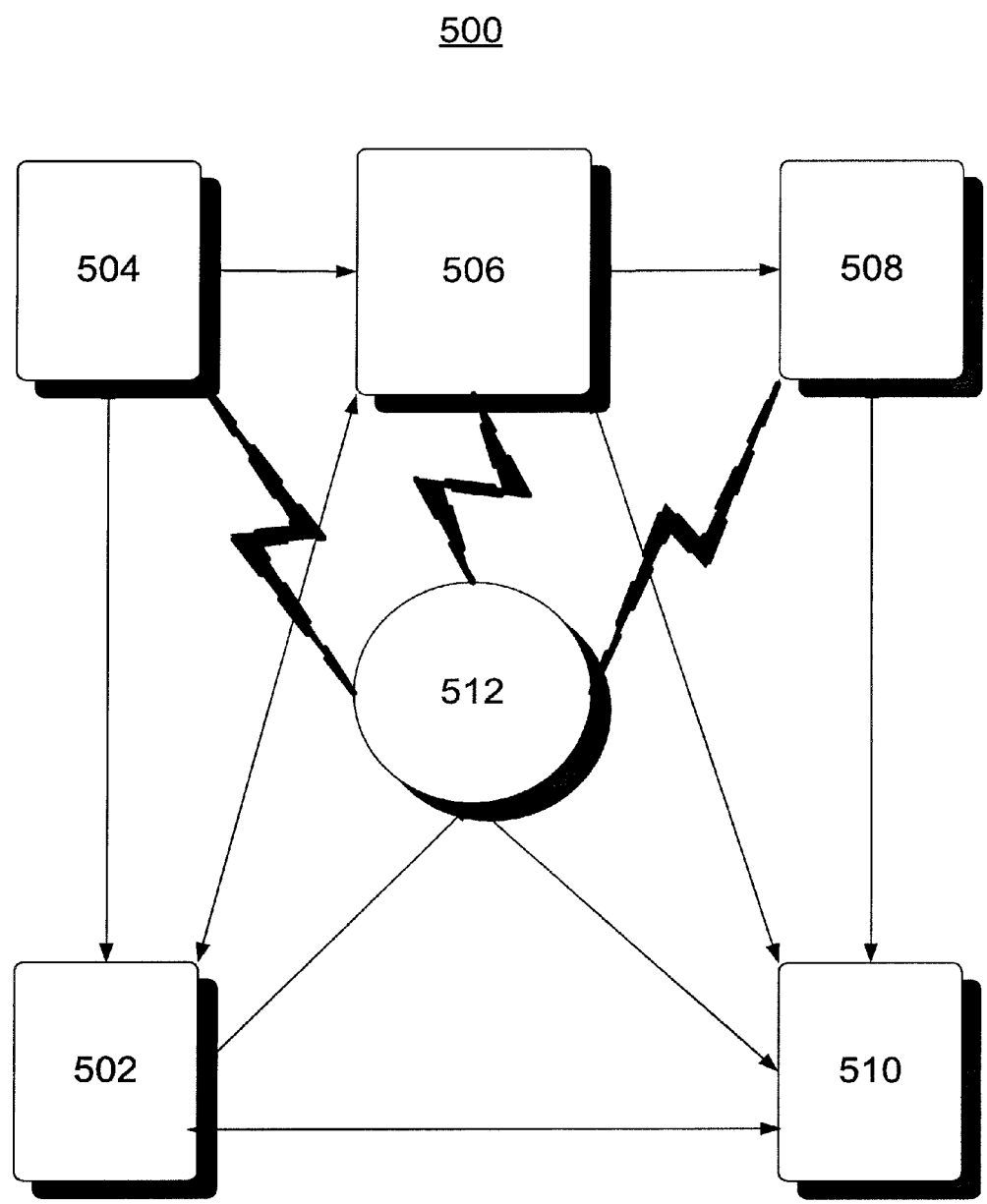
FIG. 5 shows a block diagram of an exemplary payment processing system in which the exemplary methods depicted in FIGS. 1, 2, 3 and 4 can be implemented.

As background information for the foregoing description, as will be readily understood by persons of ordinary skill in payment systems, a transaction such as a payment transaction in a payment system can include participation from different entities that are each a component of the payment processing system. An exemplary payment processing system is depicted in FIG. 5 as the payment processing system 500. The payment processing system 500 includes an issuer 504 such as the issuer; a transaction handler 506, such as the transaction handler; an acquirer 508 such as the acquirer; a merchant 510 such as the merchant; and a consumer 502 such as the consumer. The acquirer 508 and the issuer 504 can communicate through the transaction handler 506. The merchant 510 may utilize at least one Point of Service (POS) terminal that can communicate with the acquirer 508, the transaction handler 506, or the issuer 504. Thus, the POS terminal is in operative communication with the payment processing system 500.

Typically, a transaction begins with the consumer 502 presenting account number of the account such as through the use of a computer terminal or a portable consumer device 512 to the merchant 510 to initiate an exchange for a good or service. The consumer 502 may be an individual or a corporate entity. The consumer 502 may be an account holder of the account issued by the issuer 504 such as a joint account holder of the account or a person having access to the account such as an employee of a corporate entity having access to a corporate account. The portable consumer device 512 may include a payment card, a gift card, a smartcard, a smart media, a payroll card, a health care card, a wrist band, a machine readable medium containing account information, a keychain device such as the SPEEDPASS® commercially available from ExxonMobil Corporation or a supermarket discount card, a cellular phone, personal digital assistant, a pager, a security card, a computer, an access card, a wireless terminal, or a transponder. The portable consumer device 512 may include a volatile or non-volatile memory to store information such as the account number or a name of the account holder.

The merchant 510 may use an acceptance point device, such as a POS terminal, to obtain account information, such as the indicator for the account (e.g., the account number of the account), from the portable consumer device 512. The portable consumer device 512 may interface with the POS terminal using a mechanism including any suitable electrical, magnetic, or optical interfacing system such as a contactless system using radio frequency, a magnetic field recognition system, or a contact system such as a magnetic stripe reader. The POS terminal sends a transaction authorization request to the issuer 504 of the portable consumer device 512. Alternatively, or in combination, the portable consumer device 512 may communicate with the issuer 504, the transaction handler 506, or the acquirer 508.

The issuer 504 may authorize the transaction using the transaction handler 506. Authorization includes the issuer 504, or the transaction handler 506 on behalf of the issuer 504, authorizing the transaction in connection with instructions of the issuer 504, such as through the use of business rules. The business rules could include instructions or guidelines from the transaction handler 506, the consumer 502, the merchant 510, the acquirer 508, the issuer 504, a financial institution, or combinations thereof. The transaction handler 506 may maintain a log or history of authorized transactions. Once approved, the merchant 510 can record the authorization and allow the consumer 502 to receive the good or service.

The merchant 510 may, at discrete periods, such as the end of the day, submit a list of authorized transactions to the acquirer 508 or other components of the payment processing system 500. The transaction handler 506 may compare the submitted authorized transaction list with its own log of authorized transactions. If a match is found, the transaction handler 506 may route authorization transaction amount requests from the corresponding acquirer 508 to the corresponding issuer 504 involved in each transaction. Once the acquirer 508 receives the payment of the authorized transaction amount from the issuer 504, it can forward the payment to the merchant 510 less any transaction costs, such as fees. If the transaction involves a debit or pre-paid card, the acquirer 508 may choose not to wait for the initial payment prior to paying the merchant 510.

There may be intermittent steps in the foregoing process, some of which may occur simultaneously. For example, the acquirer 508 can initiate the clearing and settling process, which can result in payment to the acquirer 508 for the amount of the transaction. The acquirer 508 may request from the transaction handler 506 that the transaction be cleared and settled. Clearing includes the exchange of financial information between the issuer 504 and the acquirer 508 and settlement includes the exchange of funds.

The transaction handler 506 can provide services in connection with clearing and settlement of the transaction. For example, the clearing and settlement of the transaction that involves credit may occur after the authorization of the transaction. The settlement of the transaction involves an issuer 504 withdrawing an amount of a transaction settlement from a clearinghouse, such as an issuer clearing bank, for deposit into a settlement house, such as a settlement bank. The transaction handler 506 deposits the amount of the transaction settlement into an acquirer clearing bank. The corresponding acquirer 508 withdraws the amount of the transaction settlement from the acquirer clearing bank. Typically, the issuer 504 chooses the issuer clearing bank, the transaction handler 506 chooses the settlement back, and the acquirer chooses the clearing bank. When the transaction involves debit, the clearing may occur during the authorization process. Thus, a typical transaction involves various entities to request, authorize, and fulfill the processing of the transaction for clearing and settlement.

It should be understood implementations can be in the form of control logic, in a modular or integrated manner, using software, hardware or a combination of both. The steps of a method, process, or algorithm described in connection with the implementations disclosed herein may be embodied directly in hardware, in a software module executed by a processor, or in a combination of the two.

Figure 6:
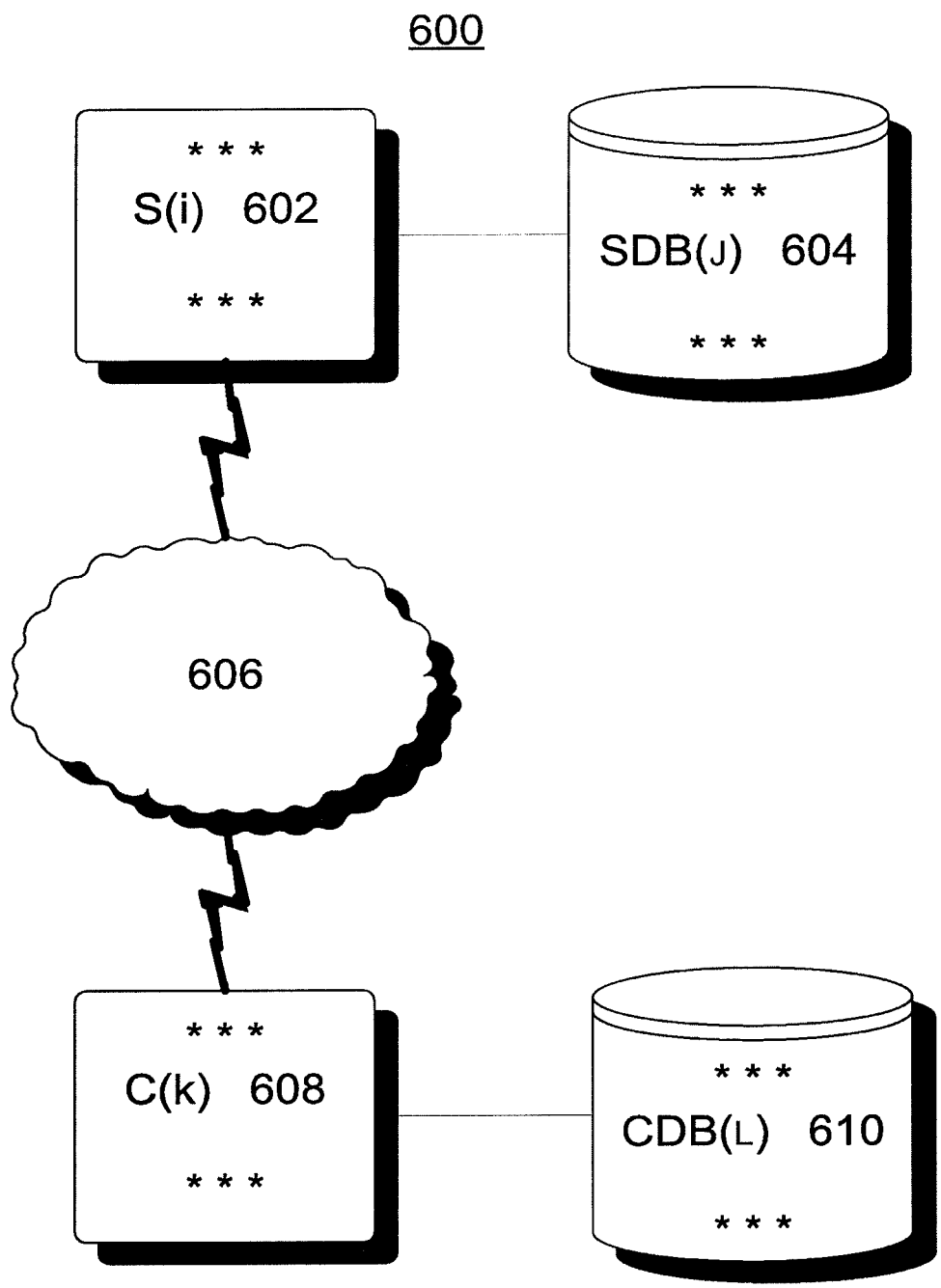
FIG. 6 is a block level diagram illustrating an exemplary client-server environment for processing a debt of the buyer to the seller.

For example, referring to FIG. 6, a block level diagram illustrates an exemplary client-server environment for processing the debt of the buyer to the seller. A server S(i) 602 may consist of a single server or a server farm distributed over a geographical location. The server S(i) 602 may be communicatively linked to the SDB(J) 604 such as the server database. The SDB(J) 604 that may consist of a plurality of SDB(H) 604, for example. The server S(i) 602 may be communicatively connected to at least one client C(k) 608 via a network 606. The network 606 may be an Ethernet network, a wireless network, a Local Area Network, a Wide Area Network, a Global Area Network, the Internet, a Home Phoneline Networking Alliance network, Power line communication network, or a combination thereof, for example. The network may include hardware building blocks to interconnect network nodes, such as: Bridges, Hubs, Switches, Routers or Network Interface Cards (NICs). The building blocks may be connected via galvanic cable, microwave links, optical cable, or be wirelessly connected such as through radio waves or electromagnetic waves, for example.

The client C(I) 608 may be connected to a client database such as CDB(L) 610. The CDB(L) 610 may have geographically distributed or be in a single location.

In one implementation, the transaction handler may utilize the server S(i) 602 to facilitate processing of computer implemented code that when executed performs the steps denoted in FIGS. 1 through 4. The SDB(J) 604 may store the received debt, the consumer identifier, the merchant identifier, the received transactions, and other data involved in automatically processing payments from the buyer to the seller. Similarly, the client C(k) 608 may utilize the CDB(L) 610 to store information. For example, the ERP of the buyer may be in communication with the CDB(L) 610 to store the accounts payable of the buyer.

The various steps or acts in a method or process may be performed in the order shown, or may be performed in another order. Additionally, one or more process or method steps may be omitted or one or more process or method steps may be added to the methods and processes. An additional step, block, or action may be added in the beginning, end, or intervening existing elements of the methods and processes. Based on the disclosure and teachings provided herein, a person of ordinary skill in the art will appreciate other ways and/or methods for various implements.

It is understood that the examples and implementations described herein are for illustrative purposes only and that various modifications or changes in light thereof will be suggested to persons skilled in the art and are to be included within the spirit and purview of this application and scope of the appended claims.

What is claimed is:

1. A computer-implemented method comprising a plurality of steps each being performed by one or more servers executing software via one or more computer processors and in communication with one or more databases, wherein the steps comprise:

receiving, by at least one of the one or more computer processors, a seller identifier for a seller to whom a debt is owed by a consumer;

determining, by at least one of the one or more computer processors and using the seller identifier, whether the seller accepts payments upon an account issued to the consumer by an issuer;

in response to determining that the seller does not accept payments upon the account, addressing, by at least one of the one or more computer processors, a first notice to the consumer seeking collaboration from the consumer to ask the seller to accept payments upon the account; and in response to determining that the seller does accept payments upon the account, addressing, by at least one of the one or more computer processors, a second notice to the consumer requesting the consumer to have the issuer issue to the consumer, within the account, a sub-account that is unique to the seller for making a future transaction between the consumer and the seller payable upon the sub-account.

2. The computer-implemented method as defined in claim 1, wherein the steps further comprise:
   in response to determining that the seller does accept payments upon the account:
      receiving a confirmation that the issuer has issued the sub-account including an indicator for the sub-account;
      receiving the future transaction between the consumer and the seller including the indicator for the sub-account; and
      notifying the issuer that the future transaction between the consumer and the seller is payable upon the sub-account.

3. The computer-implemented method as defined in claim 2, wherein:
   the first notice includes at least one of:
      the name of the seller;
      a description that the seller does not currently accept payments on the account;
      a request that the consumer approve solicitation of the seller to accept payments upon the account; and
      a request for information on how to solicit the seller to accept payments upon the account; and
   the confirmation includes at least one of:
      the name of the consumer;
      the name of the issuer that issued the sub-account,
      a sub-account number;
      the name of the seller; and
      a credit limit of the sub-account.

4. The computer-implemented method as defined in claim 1, wherein:
   for each of a plurality of debts of the consumer owed to a plurality of sellers, receiving a seller identifier includes receiving data about the corresponding debt owed by the consumer to the respective seller; and
   the steps further comprise for each seller that is determined to accept payments upon the account:
      aggregating, using the seller identifier, the plurality of said debts of the consumer owed to the seller;
      addressing a notice to the issuer requesting the issuer to set a credit limit of the corresponding sub-account to match the aggregated plurality of said debts of the consumer owed to the seller; and
      addressing a notice to the seller requesting the seller to submit the future transaction payable upon the corresponding sub-account to the corresponding acquirer of the seller for the funds matching the aggregated plurality of said debts of the consumer owed to the seller.

5. The computer-implemented method as defined in claim 4, wherein the steps further comprise:
   receiving indicia that the future transaction has been cleared and settled, wherein the funds that have been cleared and settled have been for a first portion of the debt of the consumer owed to the seller; and
   subsequent to receiving the indicia, requesting the issuer to set another credit limit of the corresponding sub-account to match a second portion of the debt of the consumer owed to the seller.

6. The computer-implemented method as defined in claim 4, wherein the steps further comprise:
   receiving indicia that the future transaction has been cleared and settled, and subsequent to receiving the indicia, requesting the issuer to set the credit limit of the corresponding sub-account to zero.

7. The computer-implemented method as defined in claim 1, wherein the steps further comprise facilitating payment of the debt of the consumer owed to the seller by conducting at least one of the following:
   requesting the issuer to disburse the funds from the consumer to the seller determined to accept payments upon the account for the future transaction that is payable upon the sub-account for a value matching an amount owed in the debt of the consumer to the seller determined to accept payments upon the account;
   requesting the issuer to disburse the funds from the consumer to the seller determined to accept payments upon the account for the future transaction that is payable upon the account for the value matching the amount owed;
   requesting a first financial institution to submit a check from the consumer to the seller for the value matching the amount owed;
   requesting a second financial institution to submit a money order from the consumer to the seller for the value matching the amount owed; and
   requesting a third financial institution to submit an Automated Clearing House credit transfer from the consumer to the seller for the value matching the amount owed.

8. A computer-implemented method comprising a plurality of steps each being performed by one or more servers executing software via one or more computer processors and in communication with one or more databases, wherein the steps include:
   receiving, by at least one of the one or more computer processors, data about a plurality of debts owed by a consumer to a merchant;
   addressing, by at least one of the one or more computer processors, a first notice to the consumer requesting the consumer to have an issuer issue to the consumer, within an account issued to the consumer by the issuer, a sub-account that is unique to the merchant for making a future transaction between the merchant and the consumer payable upon the sub-account;
   aggregating, by at least one of the one or more computer processors and using the seller identifier, the debts owed to the merchant; and
   addressing, by at least one of the one or more computer processors, a transmission to the issuer requesting the issuer to set a credit limit for the sub-account corresponding to the aggregated debts owed to the merchant.

9. The method as defined in claim 8, wherein the steps further comprise:
   addressing a second notice to the merchant requesting the merchant to include an indicator for the sub-account with the future transaction;
   receiving the indicator for the sub-account in conjunction with the future transaction; and
   notifying the issuer that the future transaction is payable upon the subaccount.

10. The method as defined in claim 8, wherein the steps further comprise validating that the future transaction is payable upon the sub-account by matching:
   a first consumer identifier stored in a server database with a second consumer identifier received in the future transaction; and
   a second merchant identifier received in the future transaction with a third merchant identifier stored in the server database that corresponds to the sub-account.

11. The method as defined in claim 8, wherein the steps further comprise conducting an audit on the debts by reconciling a value of the funds for the future transaction with the aggregated debts owed to the merchant.

12. The method as defined in claim 11, wherein reconciling includes determining an equivalence of at least one of:
   a first purchase order identifier associated with one of said plurality of debts with a second purchase order identifier within the future transaction;
   a first invoice identifier associated with one of said plurality of debts with a second invoice identifier within the future transaction; and
   the value of funds with an amount owed in one of said plurality of debts.

13. The method as defined in claim 8, wherein the steps further comprise:
   receiving indicia that the future transaction has been cleared and settled;
   disassociating the sub-account from the merchant; and
   associating the sub-account with another merchant.

14. A computer-implemented method comprising a plurality of steps each being performed by one or more servers executing software via one or more computer processors and in communication with one or more databases, wherein the steps include:
   receiving, by at least one of the one or more computer processors, a buyer identifier for a buyer that owes a debt to a merchant;
   determining, by at least one of the one or more computer processors and using the buyer identifier, whether the buyer accepts payments upon an account issued to the buyer by an issuer;
   in response to determining that the buyer does not accept payments upon the account, addressing, by at least one of the one or more computer processors, a first notice to the merchant seeking permission from the merchant to ask the buyer to accept payments upon the account; and
   in response to determining that the buyer does accept payments upon the account, addressing, by at least one of the one or more computer processors, a second notice to the buyer requesting the buyer to have the issuer issue to the buyer, within the account, a sub-account that is unique to the merchant for making a future transaction between the buyer and the merchant payable upon the sub-account.

15. The computer-implemented method as defined in claim 14, wherein the steps further comprise:
   in response to determining that the buyer does accept payments upon the account:
      receiving a confirmation that the issuer has issued the sub-account including an indicator for the sub-account;
      receiving the future transaction between the buyer and the merchant including the indicator for the sub-account; and
      notifying the issuer that the future transaction between the buyer and the merchant is payable upon the sub-account.

16. The computer-implemented method as defined in claim 14, wherein:
   for each of a plurality of debts of the buyer owed to the merchant, receiving a buyer identifier includes receiving data about the corresponding debt owed by the buyer to the merchant; and
   the steps further comprise for each buyer that is determined to accept payments upon the account:
      aggregating, using the buyer identifier, the plurality of debts owed by the buyer to the merchant;
      addressing a notice to the issuer requesting the issuer to set a credit limit of the corresponding sub-account to match the aggregated plurality of debts of the buyer owed to the merchant; and
      addressing a notice to the merchant requesting the merchant to submit the future transaction payable upon the corresponding sub-account to the acquirer for the funds matching the aggregated plurality of said debts of the buyer owed to the merchant.

17. The computer-implemented method as defined in claim 14, wherein the steps further comprise facilitating payment of the debt of the buyer owed to the merchant by conducting at least one of the following:
   requesting the issuer to disburse the funds from the buyer determined to accept payments upon the account to the merchant for the future transaction that is payable upon the corresponding sub-account for a value matching an amount owed in the debt of the buyer owed to the merchant;
   requesting the issuer to disburse the funds from the buyer determined to accept payments upon the account to the merchant for the future transaction that is payable upon the account for the value matching the amount owed;
   requesting a first financial institution to submit a check from the buyer to the merchant for the value matching the amount owed;
   requesting a second financial institution to submit a money order from the buyer to the merchant for the value matching the amount owed;
   requesting a third financial institution to submit an Automated Clearing House credit transfer from the buyer to the merchant for the value matching the amount owed; and
   requesting a fourth financial institution to submit a financial message within a cooperative of financial institutions requesting a currency transfer from the buyer to the merchant for the value matching the amount owed.

18. The computer-implemented method as defined in claim 14, wherein the steps further comprise conducting an audit of the debt of the buyer owed to the merchant by reconciling the value with the amount owed.

19. A computer-implemented method comprising a plurality of steps each being performed by one or more servers executing software via one or more computer processors and in communication with one or more databases, wherein the steps include:
   receiving, by at least one of the one or more computer processors, data about a plurality of debts owed to a merchant by a plurality of consumers, wherein each of said plurality of debts includes a consumer identifier unique to each of said plurality of consumers;
   addressing, by at least one of the one or more computer processors and to each of said plurality of consumers, a first notice requesting that the consumer have an issuer issue, within an account issued to the consumer by the issuer, a sub-account that is unique to the merchant for making a future transaction between the consumer and the merchant payable upon the sub-account; and
   for each sub-account corresponding to each consumer:
      aggregating, by at least one of the one or more computer processors and using the consumer identifier, the debts corresponding to the consumer; and
      addressing, by at least one of the one or more computer processors, a transmission to the issuer requesting the issuer to set a credit limit for the sub-account corresponding to the aggregated debts of the consumer.

20. The method as defined in claim 19, wherein the steps further comprise for each sub-account corresponding to each consumer:
   addressing a second notice to the merchant requesting the merchant to include an indicator for the sub-account with the future transaction;
   receiving the indicator for the sub-account in conjunction with the future transaction; and
   notifying the issuer that the future transaction is payable upon the sub-account.

21. The computer-implemented method as defined in claim 19, wherein the steps further comprise, for the each consumer, conducting an audit of the plurality of debts owed to the merchant by reconciling, for each corresponding sub-account, a value of funds disbursed for the future transaction with the aggregated debts of each consumer owed to the merchant.

22. The computer-implemented method as defined in claim 21, wherein the reconciling includes matching at least one of:
   a first purchase order identifier associated with one of the debts with a second purchase order identifier within the future transaction; and
   a first invoice identifier associated with one of the debts with a second invoice identifier within the future transaction.

23. The method as defined in claim 19, wherein the steps further comprise:
   for each sub-account corresponding to each consumer:
      determining whether an automatic clearing and settling of the sub-account has been preset; and
      if it is determined that an automatic clearing and settling of the sub-account has been preset, then clearing and settling the future transaction for the amount of the aggregated debts corresponding to the consumer.

* * * * *